June 10, 1924.
C. H. RAY
TRACTOR HARVESTER TRANSMISSION
Filed April 3, 1922  3 Sheets-Sheet 1
1,496,999
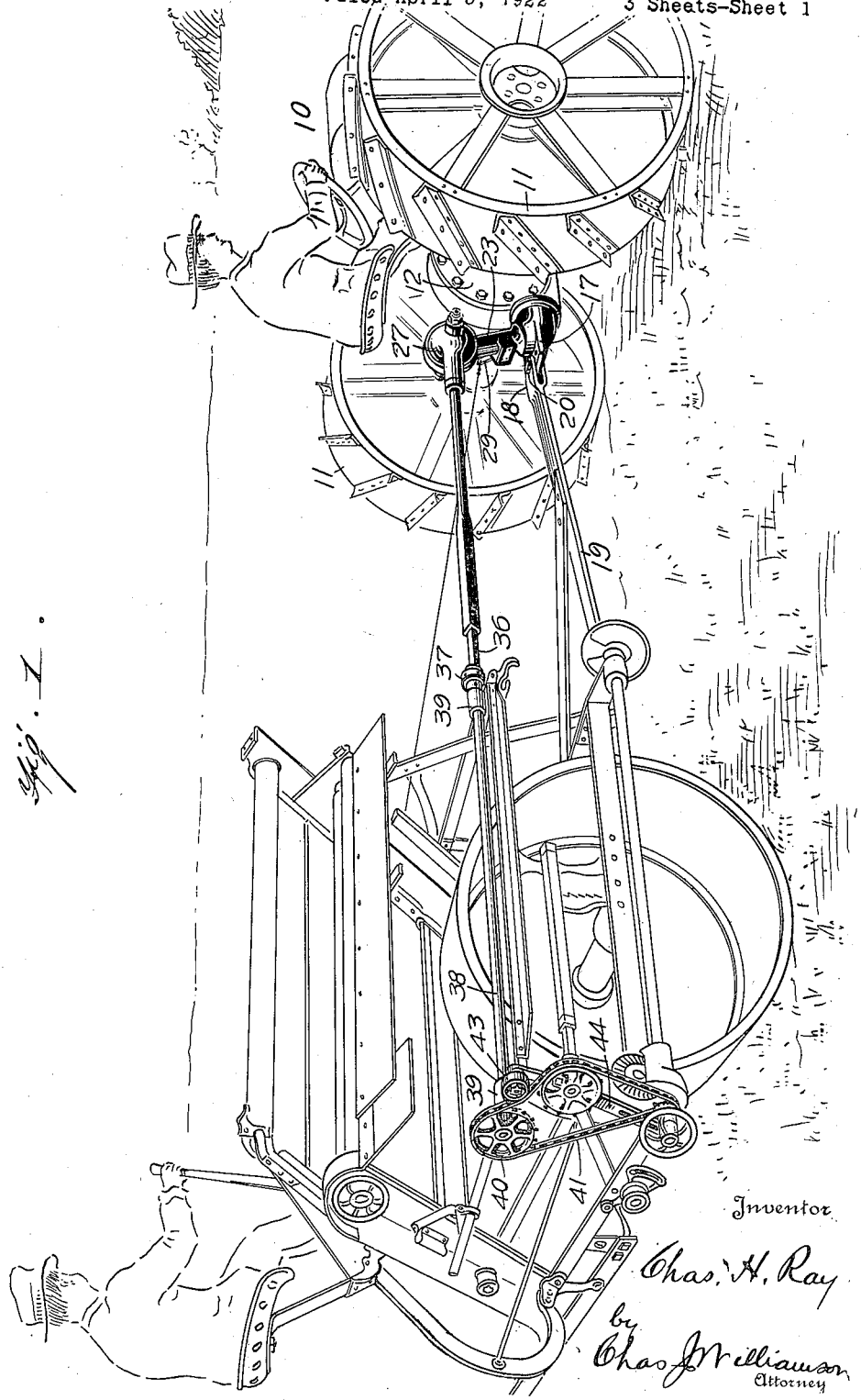

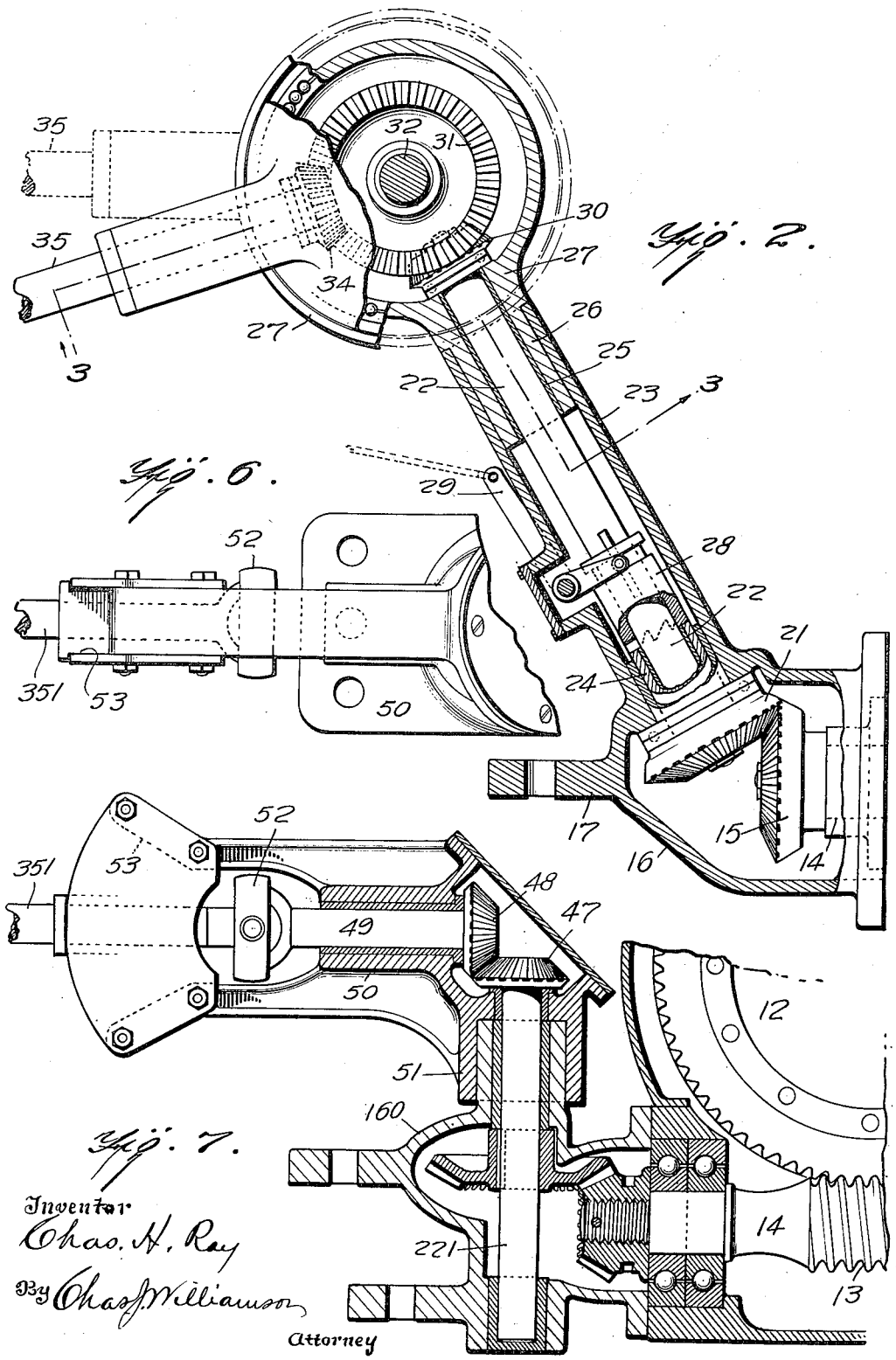

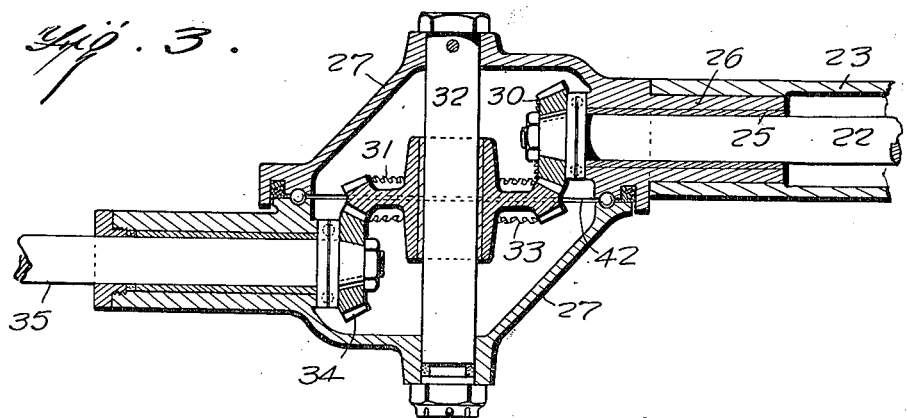
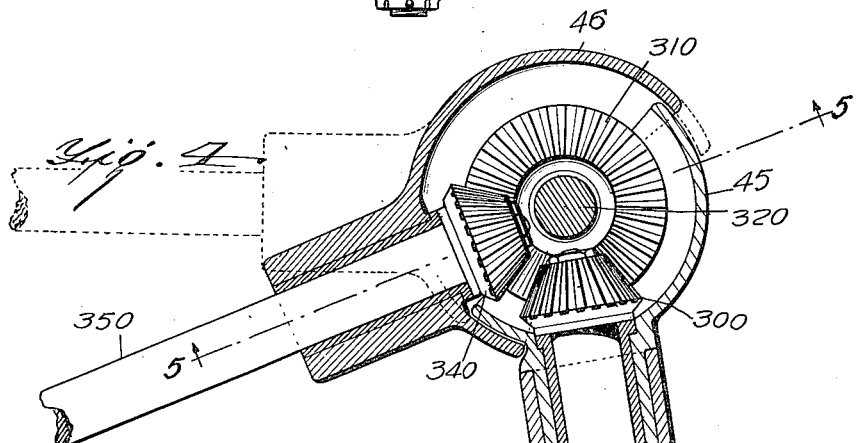
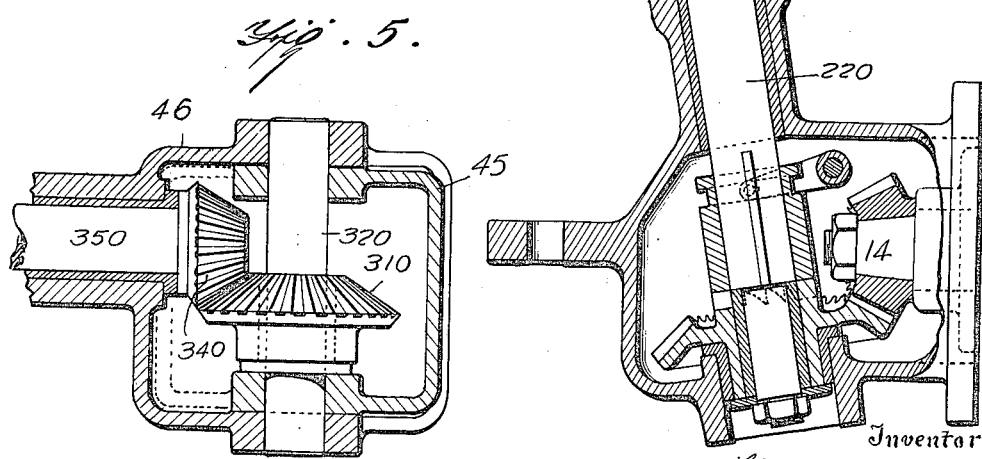

Patented June 10, 1924.

1,496,999

UNITED STATES PATENT OFFICE.

CHARLES H. RAY, OF STUTTGART, ARKANSAS.

TRACTOR HARVESTER TRANSMISSION.

Application filed April 3, 1922. Serial No. 549,129.

*To all whom it may concern:*

Be it known that I, CHARLES H. RAY, residing at Stuttgart, county of Arkansas, and State of Arkansas, a citizen of the United States, have invented certain new and useful Improvements in Tractor Harvester Transmissions, of which the following is a specification.

My invention relates to tractor-propelled and driven harvesters or like machinery which is moved over the ground, and stated in general terms, my object is to provide a driving and operating connection between the tractor and the machine which will be of simple and yet efficient construction and will at all times, regardless of the ground conditions and trying strains which are unavoidable under the conditions of operation, maintain effective driving and tractive connection between the tractor and the machine to be propelled and operated. My invention consists in any construction which is described by or included within the terms or scope of the appended claims.

In the accompanying drawings which form a part of the specification,—

Fig. 1 is a perspective view of enough of a connected tractor and self-binding harvester to illustrate an embodiment of my invention;

Fig. 2 is a detail view in vertical section of a portion of a power transmitting connection between the tractor and the harvester for operating the latter;

Fig. 3 is a section on the line 3—3 of Fig. 2;

Figs. 4 and 5 are similar views to Figs. 2 and 3 of a different embodiment of my invention;

Figs. 6 and 7 are similar views of yet another embodiment of my invention.

Referring in detail to what is shown in the drawings, the tractor, 10, is one driven by a gas engine and includes a pair of rear wheels, 11, mounted on the rear axle with a differential gear, 12, that is driven by a worm, 13, on a horizontal driving shaft, 14, that receives motion from the gas engine in a way not necessary to be described, the rear end of said driving shaft having fixed to it a bevel pinion, 15, from which power is taken as hereinafter described to operate the harvester machanism, which pinion and other adjacent parts is enclosed in a housing, 16, from which projects rearwardly a horizontal draw-bar, 17, from which a connection is made with the harvester located in rear of the tractor so that the harvester is drawn or pulled along by the tractor, and, of course, at the same time, power is transmitted to the various members of the harvester to cut the grain and bind it into bundles, all as is done by the modern self-binding harvester.

To the draw-bar, 17, a clevis, 18, at the front end of the harvester tongue, 19, is attached, the connection between the clevis and the draw-bar being by a vertical bolt, 20, which permits of sidewise play of the coupled parts on the vertical axis which the bolt connection affords, and the rear end of the tongue, 19, is attached, as usual by a hinge connection, not shown, to the front of the harvester frame, so that the tongue and harvester are flexibly connected to allow a certain amount of vertical swing or play. Thus the draft connection between the tractor and the harvester affords such flexibility as may be necessary to allow for limited relative movement of tractor and harvester horizontally and vertically.

Describing now the power connection between the tractor and the harvester by which the movements of the harvester are accomplished, which movements are usually produced by suitable operative connection between the master wheel and such members, and referring first to what is shown in Figs. 2 and 3, it will be found that the bevel pinion, 15, on the tractor driving shaft meshes with a like pinion, 21, on the lower end of an upwardly and rearwardly inclined shaft, 22, which is enclosed by an upwardly and rearwardly inclined hollow or tubular extension, or arm, 23, from the housing, 16, such shaft, 22, turning in a bearing, 24, mounted in the lower end of said arm, 23, and at its upper end turning in a bearing, 25, that is carried in the tubular extension, 26, of a housing, 27, which extension, 26, rotatably fits within the upper end of the hollow arm, 23, so that there may be turning of the housing, 27, on an axis coincident with the axis of the shaft, 22. The bevel pinion, 21, is loose on the shaft, 22, but may be clutched to and unclutched therefrom by a clutch collar, 28, splined to the shaft, 22, and which by a lever, 29, that extends to the exterior of the hollow arms, 23, may be moved along the shaft, 22, to clutch or unclutch the bevel gear to the shaft, 22, the lever, 29, being suitably connected to an operating lever or handle in convenient reach of the driver of the tractor, and thus the operation of the harvester mechanism is within the control of the driver of the tractor because, as will appear, the shaft, 22, is connected with the harvester mechanism.

Upon the upper end of the shaft, 22, within the housing, 27, is a bevel pinion, 30, which meshes with a bevel gear, 31, on a short horizontal shaft, 32, journaled in bearings in the housing, 27, and the gear, 31 is attached to, or is part of, a similar gear, 33, which meshes with a bevel pinion, 34, on the forward end of a shaft, 35, which is mounted in bearings at one end in the housing, 27, and thence extends substantially horizontally rearward and at its rear end is hollow or tubular to telescopically receive a horizontal shaft, 36, which at its rear end is connected by a universal joint, 37 with a horizontal shaft, 38, that is supported by brackets, 39, on the harvester frame so as to extend parallel with the line of draft and which shaft, 38, at its rear end has a sprocket wheel, 40, from which power is delivered to the harvester mechanism through a sprocket chain, 41. The two telescopically connected shafts are connected so as to rotate together, as by making the telescope portions thereof square, or polygonal, in cross section.

It will be seen that by the gear connection within the housing, 27, through which the shafts, 22 and 35, are connected, a universal joint is provided which allows the housing, 27, to swing sidewise on the shaft, 22, and the shaft, 35, to swing vertically on the shaft, 32, as an axis, this being possible because the housing, 27, has a joint, 42, which lies between and parallel with the axes of the two shafts, 22 and 35, so that one section of such housing is connected with the hollow arm, 23, and the other section of such housing is connected with the shaft, 35, and thus there may be oscillating movement of the shaft, 35, in a vertical direction on the joint, 42. The shafts, 22 and 35, are of necessity in planes out of alinement but which planes are parallel.

An idler, 43, for giving proper tension to the sprocket chain that passes over the sprocket wheel, 40, is carried by an arm, 44, adjustably attached to the harvester frame at the back thereof.

Referring to what is shown in Figs. 4 and 5, the shaft, 220, corresponding with the shaft, 22, shown in Fig. 2, and the shaft, 350, corresponding with the shaft, 35, in Fig. 2, are connected together by gearing and a universal joint which comprises bevel pinions, 300, and 340, on the respective shafts which mesh with a single bevel gear, 310, on a horizontal shaft, 320, which is supported at its opposite ends by bearings in a housing that comprises concentric members, 45, and 46, which are, respectively, mounted upon the two shafts, 220 and 350, each of which housings is partially cylindrical, or extends through substantially less than the arc of a circle, to allow relative turning movement of one with reference to the other on the axis of the shaft, 320.

Referring to what is shown in Figs. 6 and 7, a shaft, 221, appears corresponding to the shaft, 22, arranged in a vertical position and at its upper end has a bevel pinion, 47, which meshes with a like pinion, 48, on a short horizontal shaft, 49, which is supported in a bearing, 50, which has a vertical pivotal connection, 51, with the housing, 160, which corresponds with the housing, 16, shown in Fig. 2, and the shaft, 49, is connected by a universal joint, 52, with a shaft, 351, corresponding with the shaft, 35, in Figs. 1 and 2, the front end of the shaft, 351, being supported in bearings that are vertically movable in a segment-shaped slot, 53, in a rearward extension of the bearing, 50, which allows vertical oscillation of the shaft, 351, with reference to the shaft, 49, while horizontal oscillation is permitted by the vertical pivotal connection, 51.

It will be seen that by my invention a draft or tractive connection with the harvester and a driving or transmission connection between the tractor and the harvester mechanism are provided that are strong so as to be capable of successfully withstanding the severe usage which field use imposes and are flexible to meet the requirements of such connections between a tractor and a harvester.

By the term "harvester" I mean to include a harvesting machine as such and other agricultural machinery presenting similar requirements as to tractive and operating connections with a tractor.

What I claim is:

1. The combination of a harvester or the like, a tractor having a driving shaft extending from front to rear, a housing at the rear end of such shaft having a drawbar, a hollow arm extending upwardly from said housing, a shaft in such arm, gearing in the housing between said shafts, a rearwardly extending shaft operatively and flexibly connected with said hollow arm shaft, a support for the forward end of said rearwardly extending shaft, and an operative connection between said rearwardly extending shaft and the harvester mechanism.

2. The combination of a harvester or the like, a tractor having a driving shaft that extends from front to rear, a housing at the rear end of such shaft having a drawbar, a hollow arm extending upwardly from said housing, a shaft in such arm, gearing in the housing between said shafts, a rearwardly extending shaft operatively and flexibly connected with the shaft in the hollow arm, a support for the forward end of said rearwardly extending shaft, and an operative connection between said rearwardly extending shaft and the harvester mechanism, comprising a substantially horizontally extending shaft mounted on the harvester and a universal joint between the forward end of said shaft and said rearwardly extending shaft.

3. The combination of a tractor having a forwardly and rearwardly extending drive shaft, a housing at the rear end of said shaft having a draw-bar, a harvester or the like, a tongue extending forwardly from the harvester and pivotally connected with said draw-bar, an upwardly extending hollow arm on said housing, a shaft within such arm, bevel gears within the housing connecting the drive shaft and the shaft within the arm, a rearwardly extending shaft operatively connected with the harvester mechanism at its rear end, a gear connection between the forward end of said shaft and the upper end of the shaft within the hollow arm, a housing for said gear connection comprising members pivotally connected together, one of said members having a bearing for the forward end of said rearwardly extending shaft, and a pivotal connection between the other member of said housing and the upper end of said hollow arm.

4. The combination of a tractor having a forwardly and rearwardly extending drive shaft, a housing at the rear end of said shaft having a draw-bar, a harvester or the like, a tongue extending forwardly from the harvester and pivotally connected with said draw-bar, an upwardly extending hollow arm on said housing, a shaft within such arm, bevel gears within the housing connecting the drive shaft and the shaft within the arm, a rearwardly extending shaft operatively connected with the harvester mechanism at its rear end, a gear connection between the forward end of said shaft and the upper end of the shaft within the hollow arm, a housing for said gear connection comprising members pivotally connected together, one of said members having a bearing for the forward end of said rearwardly extending shaft, and a pivotal connection between the other member of said housing and the upper end of said hollow arm, the pivotal connection between said housing members comprising a shaft that forms part of the gear connection between the shaft in the hollow arm and the rearwardly extending shaft.

5. The combination of a tractor having a driving shaft that extends from front to rear, a housing at the rear end of such shaft having a draw-bar, a hollow arm extending upwardly from said housing, a shaft in such arm, gearing in the housing between said shafts, a rearwardly extending shaft operatively and flexibly connected with said hollow arm shaft, a support for the forward end of said rearwardly extending shaft, a harvester or the like, an operative connection between said rearwardly extending shaft and the harvester mechanism, and means to connect and disconnect the shaft in the hollow arm with the gearing in the housing.

In testimony whereof I hereunto affix my signature.

CHARLES H. RAY.